(12) United States Patent
Maillet et al.

(10) Patent No.: US 6,303,689 B1
(45) Date of Patent: Oct. 16, 2001

(54) METHOD OF MANUFACTURING A THERMOPLASTIC RESIN COMPOSITION AND MOULDED ARTICLES

(75) Inventors: Jérome Maillet; Kiyotaka Ishino; Takatoshi Kuratsuji, all of Kyoto (JP)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/284,082

(22) PCT Filed: Jul. 20, 1998

(86) PCT No.: PCT/EP98/04521

§ 371 Date: Jun. 11, 1999

§ 102(e) Date: Jun. 11, 1999

(87) PCT Pub. No.: WO99/07769

PCT Pub. Date: Feb. 18, 1999

(30) Foreign Application Priority Data

Aug. 8, 1997 (JP) .................................................. 9-214232

(51) Int. Cl.$^7$ ............................. C08L 71/02; C08L 77/00
(52) U.S. Cl. ............................. 525/66; 525/64; 525/92 A; 525/125; 525/131; 525/166; 525/173; 525/179
(58) Field of Search ............................. 525/64, 66, 92 A, 525/125, 131, 166, 173, 179; 428/35.2, 35.5

(56) References Cited

U.S. PATENT DOCUMENTS 5,091,478 * 2/1992 Saltman ................................ 525/179
5,652,326 * 7/1997 Ueda ..................................... 528/288

FOREIGN PATENT DOCUMENTS

| 258040 | 3/1988 | (EP) . |
| 459862 | 12/1991 | (EP) . |
| 559284 | 9/1993 | (EP) . |
| 657502 | 6/1995 | (EP) . |

OTHER PUBLICATIONS

Section Ch, Week 8512, Derwent Publications Ltd., London, GB; Class A25, AN 85–070553, XP002091690 & JP 60 023435 A (Toray Ind Inc) Feb. 6, 1985.

Section Ch, Week 8931, Derwent Publications Ltd., London, GB; Class A23, AN 89–225698, XP002091691 & JP 01 13234 A (Toray Ind Inc) Jun. 27, 1989.

* cited by examiner

*Primary Examiner*—Patricia A. Short
(74) *Attorney, Agent, or Firm*—Millen, White, Zelano & Branigan, P.C.

(57) ABSTRACT

Manufacturing a thermoplastic composition, there is first melt-blended a polymer (A) containing polyether chains, e.g. a polyetherpolyamide block copolymer, with (C) a vinyl compound, e.g. a copolymer of styrene and maleic anhydride and/or a compatibilizing agent (D), e.g. a graft copolymer with a polyolefin with an unsaturated carboxylic acid and the resultant melt-blended mixture is pelletized. The resultant pellets are then blended with a polyolefin (B) e.g. polyethylene. The resultant overall blended mixture can then be molded into films having a low variation in thickness of a desired permeability of water vapor and other gases.

12 Claims, No Drawings

METHOD OF MANUFACTURING A THERMOPLASTIC RESIN COMPOSITION AND MOULDED ARTICLES

INDUSTRIAL FIELD OF APPLICATION

The present invention relates to a method of producing a thermoplastic resin composition, and to moulded articles thereof. Its objective lies in offering a method of manufacturing a resin composition having outstanding extrusion moulding properties, and the water vapour permeability of which can be controlled over a broad range while maintaining uniform performance, transparency, antistaticity and high gas permeability; together with moulded articles or packaging materials formed therefrom.

PRIOR-ART

Hitherto, on account of their ease of handling and balanced properties, thermoplastic resins such as polyolefins have been widely used in applications of various kinds, and they are also useful as packaging materials. In such circumstances, various materials have been devised and employed according to the particular objectives, ranging from permeable films of high gas permeability to barrier materials of low permeability, depending on the particular material, but few are endowed with high water vapour permeability. For example, techniques are known for blending or laminating a material of high permeability and a material of low permeability. However, when used for the storage of foodstuffs, problems have arisen such as the condensing of the water vapour in the interior to form adhering water droplets so that the contents are difficult to see, or the condensed moisture hastens the deterioration of the contents and rotting readily occurs. Again, in cases where longer term storage has been tried, there have been limits to the control of the gas permeability.

In order to resolve such difficulties, there is known the introduction of fine pores into the film either mechanically by means of a needle or the like or physico-chemically with a laser or the like, with the permeability being controlled by the hole diameter and the density of the holes present (see, for example, Japanese Unexamined Patent Publication Nos 47-23478, 62-148247 and 2-85181, etc). Again, there has been proposed the raising of the water vapour permeability by locally greatly thinning the film without introducing holes. However, with these methods there is a great difference in the permeability between the pore regions and the other regions, and not only is it difficult to obtain uniformity over the entire film but there is also the disadvantage that the film strength is lowered and the selectivity of the gas permeability is reduced.

Now, methods have also been proposed which abandon the concept of raising the permeability of the film itself and where, instead, a gas is sealed inside which controls the metabolic action, or where there is introduced an adsorbent for the harmful gases and moisture (see, for example, Japanese Unexamined Patent Publication No. 3-14480, etc). However, as well as being time-consuming, the effects of these methods are not altogether adequate.

On the other hand, compositions comprising a polyether-containing block polyamide or the like, along with a polyolefin and/or a functional polyolefin are known (see, for example, Japanese Unexamined Patent Publication No. 1-163234, and European Patent Nos 459862, 475963, 559284, 657502 and 675167, etc). As the effects thereof, moisture permeability, high impact properties and anti-static properties, etc, are described. However, these compositions comprising polyether-containing block polyamides and polyolefins have poor mouldability even when a compatibilizing agent is incorporated, and articles of stable product quality are hard to obtain.

PROBLEM TO BE RESOLVED BY THE INVENTION

As a result of intensive investigation aimed at controlling the water vapour permeability within a desired range with good reproducibility, while retaining high gas permeability and, moreover obtaining uniform performance, such as transparency or antistaticity, the present inventors discovered that these objectives could be attained by employing the so-called master batch method in which a high concentration of reactive compound is first blended, and then dilution and reaction effected in stepwise fashion. It is on this discovery that the present invention is based.

MEANS FOR RESOLVING THE PROBLEM

The present invention is a method of manufacturing a thermoplastic resin composition which is characterized in that, when blending a polymer (A) containing polyether chains as structural units and a polyolefin (B), the polymer (A) containing polyether chains as structural units is first melt-blended with a copolymer (C) of a vinyl compound and an unsaturated dicarboxylic acid or derivative thereof and/or a compatibilizing agent (D), after which the polyolefin (B) is then blended; together with moulded articles and packaging materials obtained by this method.

It is clear that the polymer (A) is first melt blended with (C) only or with (D) only or with (C) and (D).

In the present invention, 'polymer (A) containing polyether chains as structural units' refers to block copolymer in which polyoxyalkylene chains and other polymer chains are linked together or to a polymer in which polyoxyalkylene chains are combined together via coupling regions. Here as examples of the polyoxy-alkylene, there can be cited polyoxyethylene, poly(1,2- and 1,3-oxypropylene), polyoxytetramethylene, polyoxy-hexamethylene, ethylene oxide and propylene oxide block or random copolymers, and ethylene oxide and tetra-hydrofuran block or random copolymers. In particular, a polyoxyalkylene having from 2 to 4 carbons in the alkylene moiety is preferred, with polyoxyethylene being most preferred. The number average molecular weight of the polyoxyalkylene is from 200 to 6000, and preferably from 300 to 4000.

In the present invention, as examples of the 'polymer (A) containing polyether chains as structural units' desirably used, there are polyetherpolyamide block copolymers, polyetherpolyester block copolymers and polyetherurethanes. Of these, the polyetherpolyamide block copolymers are especially preferred.

The 'polyetherpolyamide block copolymer' used in the present invention is a block copolymer in which there are linked together polyoxyalkylene chains (a) and polyamide chains (b) which comprise polymer of an aminocarboxylic acid or lactam having at least six carbons, or polymer of the salt of dicarboxylic acid and diamine with at least six carbons. Where (a) and (b) are alternately linked together via a dicarboxylic acid having from 4 to 20 carbons, the copolymers are generally referred to as polyetheresteramides, and these are also included in the invention. Here, as the 'aminocarboxylic acid or lactam having at least six carbons, or polymer of the salt of a dicarboxylic acid and diamine with at least six carbons', there are preferably used 11-aminoundecanoic acid, 12-aminododecanoic acid, caprolactam, laurolactam, hexamethylenediamine/adipic acid salt, hexamethylenediamine/sebacic acid salt or the like. Further, in regard to aforesaid components (a) and (b), two or more types may also be jointly used together.

Such polymer is produced, for example, by the method described in Japanese Examined Patent Publication No. 56-45419. The types and amounts of the polyether and polyamide components in the block copolymer used in the present invention are selected according to the objectives and application. From the point of view of water vapour permeability, water resistance and the handling characteristics, etc, the polyether/polyamide ratio is preferably from 4/1 to 1/4.

The 'polyetherpolyester block copolymer' employed in the present invention is one in which there are linked together polyoxyalkylene chains (a) and polyester chains (d) comprising polymer of a hydroxycarboxylic acid with at least six carbons or of a dihydroxy compound with at least two carbons and an aromatic dicarboxylic acid. Again, in regard to these (a) and (d) components, two or more types may be jointly employed. Such polymer is produced for example by the method described in U.S. Pat. No. 4,739,012. The weight ratio of the aforesaid (a) and (d) components in the block copolymer employed in the present invention is determined by the objectives and the application. Even though they are similar thermoplastic elastomers, there is little effect with polyester-polyester block copolymers. The 'polyetherurethane' employed in the present invention is a thermoplastic polyurethane employing polyether as the soft segments, but there is little effect with the polyester type or caprolactam type even though they are also polyurethanes. Specifically, the polyurethanes are normally obtained by the reaction of an organic diisocyanate and a polyether of molecular weight from 500 to 6000 and, in some cases, chain extension is carried out in the presence of catalyst. As the diisocyanate, there is preferably employed tolylene diisocyanate, diphenylmethane diisocyanate or the like, and as the polyether there is preferably used polytetramethylene glycol or polypropylene glycol, etc.

These polyetherpolyamide block copolymers, polyetherpolyester block copolymers and polyetherurethanes can be used singly or as mixtures, or there can be used mixtures of two or more block copolymers having different types or a different ratio of the resins which respectively constitute the soft and hard segments. Again, within a range such that the objectives of the present invention are realised, they may also be blends with other resins. From amongst these, the polyetherpolyamide block copolymers are especially preferred.

In the present invention, 'polyolefin (B)' means a polymer containing an olefin component, for example a component such as ethylene, propylene or butene-1, and the following can be cited as examples.

1) Polyethylene, polypropylene and copolymers of ethylene and α-olefins, and to these polymers there may also be grafted unsaturated carboxylic acid anhydrides such as maleic anhydride or unsaturated epoxides such as glycidyl methacrylate.

2) Copolymers of ethylene and at least one type of compound selected from the group comprising (i) unsaturated carboxylic acids and the salts and esters thereof, (ii) saturated carboxylic acid vinyl esters, (iii) unsaturated dicarboxylic acids and the salts, esters, hemi-esters and anhydrides thereof, and (iv) unsaturated epoxides, and to these ethylene copolymers there may also be grafted unsaturated dicarboxylic anhydrides or unsaturated epoxides.

3) Optionally maleic-modified styrene/ethylene/butene/styrene (SEBS) block copolymer.

It is also possible to use a mixture of two or more types of such olefins.

The 'vinyl compound' from which the 'copolymer (C) of a vinyl compound and an unsaturated dicarboxylic acid or derivative thereof' is composed in the present invention is an α-olefin with from 2 to 8 carbons such as ethylene, propylene, butene, isobutylene, isoamylene and n-hexene, preferably an α-olefin with from 4 to 6 carbons, or an aromatic vinyl compound or derivative thereof such as styrene, α-methylstyrene, vinyltoluene, t-butylstyrene and chlorostyrene. Further, the 'unsaturated di-carboxylic acid or derivative thereof' from which (C) is composed is maleic acid, fumaric acid or the like, or the anhydride, ester, hemi-ester or salt thereof. These are polymerized under normal radical polymerization conditions.

Of these, copolymer comprising styrene or derivative thereof, and maleic acid or anhydride or ester thereof, is preferred. In such circumstances, the molar ratio of the styrene or derivative thereof to the maleic acid or derivative thereof is desirably from 1:1 to 4:1, and more preferably from 2:1 to 4:1.

The 'compatibilizing agent (D)' used in the present invention is a polymer for enhancing the miscibility of the polymer (A) containing polyether chains as structural units and the polyolefin (B), and it is at least one member of the group comprising 'polyolefins or copolymers thereof with (meth)acrylate or vinyl acetate, which are grafted or copolymerized with unsaturated carboxylic acid, unsaturated carboxylic acid anhydride or un-saturated epoxide'. Specifically, there can be cited, maleic-anhydride-grafted polyethylene or polypropylene, ethylene/maleic anhydride copolymer, ethylene/alkyl acrylate or vinyl acetate/maleic anhydride terpolymer and ethylene/alkyl acrylate/glycidyl methacrylate terpolymer, etc.

The blending proportions by weight of the polymer (A) containing polyether chains as structural units, the copolymer (C) of a vinyl compound and unsaturated dicarboxylic acid or derivative thereof, and/or compatibilizing agent (D), is A/C/D=50 to 95/0 to 20/0 to 40, and preferably 50 to 90/0.1 to 10/1 to 30. (However, A+C+D=100)

Polyolefin (B) is blended after first melt blending the A, C and/or D components. If the B component is blended at the same time, the stable moulding properties and uniform performance which are the objectives of the present invention are not obtained. Again, the blending proportion of the B component will differ with the desired performance, and is selected within the range A/B=1/99 to 99/1 according to the particular application. When used for the storage of items undergoing marked respiration, it is recommended that A/B=99 to 55/1 to 45, and preferably 95 to 60/5 to 40, while in the storage of items which are comparatively readily dried it is recommended that A/B=45 to 1/55 to 99, and preferably 40 to 5/60 to 95. In such circumstances, the extrusion stability is also somewhat dependent on the melt viscosity, and in the former case it is desirable that the viscosity of the A component be low, while in the latter case that that of the B component be low. B the blending of these components in such proportions, it is possible to obtain stably and with good reproducibility moulded articles in which the moisture vapour permeability is controlled over a broad range while still maintaining a high gas permeability.

To give an example of the blending method of this resin composition, resins A, C and/or D are each optionally dried, after which they are directly melt extruded in the prescribed proportions, or they are melt extruded from a previously-prepared dry blend, and formed into pellets (master pellets). After this, these master pellets are dried where required and proportionally supplied or mixed with polyolefin (B) in the prescribed proportions and melt extruded, and then, with or without first pelletizing, the composition is passed through a T-die or blown-film die and film produced. For the molten mixing, there is used an ordinary single-screw or twin-screw extruder, etc, and while the melting temperature will depend on the types of resins and their blending proportions, in general from 120 to 250° C. is employed.

In the resin composition of the present invention there can be freely included, within a range such that the characteristics of the invention are not impaired, conventionally-known antioxidants, thermal decomposition preventives, ultraviolet absorbers, hydrolysis resistance improvers, colouring agents (dyes, pigments), antistatic agents, electro-conductive agents, crystallization nucleating agents, crystallization promoters, plasticiers, ready-slip agents, lubricants, release agents, flame retardants, flame retardant assistants and the like.

The resin composition of the present invention can be used to produce extrusion moulded articles such as sheet, film and tube, etc, or injection moulded articles such as containers, etc, and it can also be employed by blending with other thermoplastic resins. When producing extrusion moulded articles, various kinds of methods can be used such as the T-die system, etc, as well as blown film extrusion.

EXAMPLES

Below, the present invention is explained in more specific terms by means of some examples but it goes without saying that the present invention is not to be restricted solely to these. Now, in the examples, the values of the various properties were measured by the following methods.

(1) MFI (units: g/10 min)

Measured at 190° C., under a 2.16 kg load, based on ASTM D1238.

(2) Moisture permeability (water vapour permeability) (units: g/m$^2$.day)

The film was measured under conditions B (40° C., 90% relative humidity) based on JIS Z0208.

(3) Gas permeability (units: Ml/M$^2$.day.atm or %)

This was measured by the differential pressure method. The specific conditions were as follows.

Device: gas permeation measurement instrument model GTR-10XE made by Yanako Binseki Kogyo (K.K.).

Test area: 15.2 cm$^2$ (44 mm diameter)

Test method: calibration curve system, based on a gas chromatograph with an attached TCD Temperature, relative humidity: 25° C., 0% PH Carrier gas: helium, 70 Kpa Diffusion gas: $CO_2/O_2/N_2/C_2H_4$ (30.0/30.0/39.12/0.88 vol %)

(4) Transparency (units: %)

The haze was measured based on ASTM D1003

(5) Antistaticity (units: ohm/sq)

Surface resistivity was measured based on ASTM D 257.

Further, the resins employed were as follows.

A-1: polyetheresterpolyamide a block copolymer comprising polyoxyethyene chains and polyamide 12 chains (weight ratio 40/60)

A-2: polyetheresterpolyamide block copolymer comprising polyoxyethyene chains and polyamide 12 chains (weight ratio 50/50)

B-1: polyethylene of MFI 2, in which there is copolymerized 9 wt % methyl acrylate B-2: polyethylene of MFI 1.6 and density 0.895 obtained by polymerization using a metallocene catalyst C-1: copolymer comprising styrene/maleic acid partial ester (molar ratio 2/1) [acid value 220]

C-2: styrene/maleic anhydride (molar ratio 3/1) copolymer

D-1: ethylene/acrylate/maleic anhydride terpolymer containing 6 wt % comonomer and 3 wt % maleic anhydride D-2: ethylene/glycidyl methacrylate copolymer containing 8 wt % glycidyl methacrylate

Example 1, Comparative Example 1

Resins A-1, C-1 and D-1 were mixed together in the proportions, by weight, of A/C/D=80/2.4/17.6, then melt extrusion carried out with a twin-screw extruder set at 160–180° C., followed by pelletizing, and master pellets obtained (taken as M1). These pellets were dried at 80° C. and then, along with resin B-1, proportional feeding was conducted at a weight ratio of 80/20 (M1/B1) using a single screw extruder fitted with a T-die set at 180° C. at the tip, and film of thickness 25$\mu$ obtained. The extrusion pressure was 8.5 MPa and the screw torque was stable at 35 Nm. The variation in thickness of the film obtained in the extrusion direction and in the direction at right angles thereto was ±0.1$\mu$ (this was taken as Film 1; Example 1).

Moreover, A-1, B-1, C-1 and D-1 were also directly dry blended in the same proportions as above, namely A/B/C/D=64/20/1.92/14.08 by weight, and film of thickness 25$\mu$ produced using the same single screw extruder fitted with a T-die. The average extrusion pressure was 8.0 MPa and the average screw torque was 33 Nm, but both fluctuated considerably, and the variation in film thickness was five times greater, at ±0.5$\mu$ (this was taken as Film 1'; Comparative Example 1).

The moisture permeability of Film 1 was 1200 g/m$^2$.day and the haze was 8% and the surface resistivity was 5×10 E(11) ohm/sq, which were not at all inferior to the values for Film 1' (1250 g/m$^2$.day and 7% and 9×10 E(11) ohm/sq, respectively).

Example 2, Comparative Examples 2 and 3

The master pellets (M1) prepared in Example 1 were dry blended with B-2 in proportions by weight of 40/60 and then, by using a single screw extruder fitted with a blown film die of diameter 15 cm and slit width 0.6 mm, there was produced blown film of thickness 30$\mu$ at a blow-up ratio of 1.5 (Film 2). The thickness variation was ±0.5$\mu$, the moisture permeability was 118 g/m$^2$.day and the haze was 11% (Example 2).

For comparison, the four resins were dry blended in the same proportions (A-1/B-2/C-1/D-1=32/60/0.96/7.04) and, using the same equipment, blown film was produced of thickness about 30$\mu$. The moisture permeability was 120 g/m$^2$.day and again the haze was about the same at 10%, but when compared to Film 2 based on the master batch method the thickness variation was double, at ±1$\mu$ (Comparative Example 2).

Further, when blown film was produced in exactly the same way as in Comparative Example 2 except that the C-1 component in that example was not used, the extruded film was unstable and, at times, the film came in contact with the cool ring where it emerged from the die, so that only film having an extremely poor surface state was obtained (Comparative Example 3).

Examples 3 and 4

Master pellets (M2 and M3) comprising the proportions A-2/C-2/D-1=75/20/5 and A-1/C-1/D-2=80/18/2 were prepared in the same way as in Example 1. By the proportional feeding of these at a ratio of M2/B-1=85/15 and M3/B-2=30/70 respectively, and using the same equipment as in Example 2, blown film was produced. The film production process was stable and it was possible to obtain a uniform film over a long period (Films 3 and 4).

Examples 5 and 6, Comparative Example 4

Film 1 and Film 4 were each cut to A4 size and by superimposing two sheets of each and heat-sealing three of the edges bags were produced (Bags 1 and 4). In Bag 1 there was introduced a peach (243 g), then the final edge heat-sealed and the bag stored at room temperature (average 23° C.). After 1 week, the gas concentrations within the bag were 7% carbon dioxide and 7% oxygen. When the peach was inspected after opening the bag, it was still fresh and the taste was good (Example 5).

When, for comparison, a peach was packaged in the same way using a commercial $25\mu$ low density polyethylene bag and heat-sealed, and then stored for 1 week at room temperature, there was a smell of alcohol from the peach and mould had developed (Comparative Example 4).

Further, three Valencia oranges were placed in Bag 4, the remaining edge then heat-sealed and the bag stored for 3 months at room temperature. Even after 3 months the appearance and taste of the oranges were good (Example 6).

EFFECTS OF THE INVENTION

As explained above, in the present invention a reactive compound is blended in prescribed proportions with a polymer having polyether chains, and then in stepwise fashion, blending and dilution by means of polyolefin, and moulding are conducted and, in this way, it is possible to obtain with good reproducibility, uniform moulded articles having desired water vapour permeability over a broad range while still maintaining a high gas permeability. In particular, it is possible to obtain films having a low variation in thickness as shown by the preceding examples.

What is claimed is:

1. A method of manufacturing a thermoplastic composition comprising: melt blending (A) a polyetherpolyamide block copolymer with (C) a copolymer of styrene and either maleic anhydride or maleic acid wherein the molar ratio of styrene to maleic acid or maleic anhydride lies in the range from 1/1 to 4/1, and optionally (D) at least one grafted or copolymerized comparibilizer selected from the group consisting of (a) a polyolefin, (b) a copolymer of an olefin with (meth)acrylate and (c) a copolymer an olefin with vinyl acetate, said (a), (b) and (c) being grafted or copolymerized with at least one of an unsaturated carboxylic acid, an unsaturated carboxylic acid anhydride and an unsaturated epoxide, to produce a melt blended mixture; pelletizing the melt blended mixture; and then blending (B) a polyolefin with the resultant pelletized mixture.

2. A method of manufacturing a thermoplastic resin composition according to claim 1, which is characterized in that in the composition comprising (A) plus (C) and optionally (D) prior to the blending of the polyolefin (B), the blending proportions by weight of (A)/(C)/(D) are 50 to 95/more than0 to 20/0 to 40, wherein A+C+D=100.

3. A method of manufacturing a thermoplastic resin composition according to claim 2, comprising melt-blending the compatibilizing agent (D).

4. A method according to claim 3, further comprising extruding the resultant blend containing the polyolefin to produce a film.

5. A film produced according to claim 4.

6. A method according to claim 1, wherein the resultant melt-blended mixture contains (A), (C) and (D).

7. A method according to claim 6, further comprising extruding the resultant blend containing the polyolefin to produce a film.

8. A film produced according to claim 7.

9. A film according to claim 8, having relative proportions of (A), (C) and (D) to one another of about 75–80/20–18/5–2 respectively.

10. A film according to claim 9, wherein (D) is either ethylene/acrylate/maleic anhydride terpolymer or ethylene/glycidyl methacrylate.

11. A method according to claim 1, further comprising extruding the resultant blend containing the polyolefin to produce a film.

12. A film produced according to claim 11.

* * * * *